(12) United States Patent
Hoffmann et al.

(10) Patent No.: US 11,091,590 B2
(45) Date of Patent: Aug. 17, 2021

(54) COPOLYAMIDES CONTAINING DIMERIC FATTY ACID AS MONOMER

(71) Applicant: EMS-PATENT AG, Domat/Ems (CH)

(72) Inventors: Botho Hoffmann, Domat/Ems (CH);
Etienne Aepli, Domat/Ems (CH);
Thomas Wiedemann, Domat/Ems (CH)

(73) Assignee: EMS-Patent AG, Domat/EMS (CH)

( * ) Notice: Subject to any disclaimer, the term of this patent is extended or adjusted under 35 U.S.C. 154(b) by 0 days.

(21) Appl. No.: 15/910,891

(22) Filed: Mar. 2, 2018

(65) Prior Publication Data
US 2018/0251600 A1 Sep. 6, 2018

(30) Foreign Application Priority Data

Mar. 3, 2017 (EP) ..................................... 17159179

(51) Int. Cl.
*C08L 77/06* (2006.01)
*C08G 69/26* (2006.01)
*C08L 77/08* (2006.01)
*C08G 69/34* (2006.01)

(52) U.S. Cl.
CPC ........... *C08G 69/265* (2013.01); *C08G 69/34* (2013.01); *C08L 77/08* (2013.01); *C08J 2377/06* (2013.01)

(58) Field of Classification Search
CPC ....... C08L 77/00; C08L 77/06; C08G 69/265; C08G 69/26
See application file for complete search history.

(56) References Cited

U.S. PATENT DOCUMENTS

| | | | |
|---|---|---|---|
| 4,740,377 A | 4/1988 | Dawes et al. | |
| 5,177,177 A | 1/1993 | Thullen et al. | |
| 5,177,178 A * | 1/1993 | Thullen | C08G 69/34 |
| | | | 528/339.3 |
| 8,383,244 B2 | 2/2013 | Bayer et al. | |
| 8,604,120 B2 | 12/2013 | Stöppelmann et al. | |
| 9,133,322 B2 | 9/2015 | Roth et al. | |
| 9,644,081 B2 | 5/2017 | Aepli et al. | |
| 9,663,655 B2 | 5/2017 | Aepli et al. | |
| 9,963,547 B2 | 5/2018 | Hoppe et al. | |
| 2012/0029133 A1 | 2/2012 | Stöppelmann et al. | |
| 2012/0175817 A1 | 7/2012 | Becker et al. | |
| 2012/0321829 A1 | 12/2012 | Bayer et al. | |
| 2014/0094548 A1 | 4/2014 | Roth et al. | |
| 2014/0171573 A1 | 6/2014 | Bayer et al. | |
| 2014/0179866 A1 * | 6/2014 | Pfleghar | C08L 77/06 |
| | | | 524/607 |
| 2015/0218374 A1 | 8/2015 | Thomas et al. | |
| 2015/0284531 A1 | 10/2015 | Aepli et al. | |
| 2015/0291795 A1 | 10/2015 | Aepli et al. | |
| 2015/0352765 A1 | 12/2015 | Hoffmann et al. | |
| 2015/0368398 A1 * | 12/2015 | Hoppe | C08G 69/265 |
| | | | 524/607 |
| 2016/0130439 A1 | 5/2016 | Koch et al. | |
| 2016/0280914 A1 | 9/2016 | Thomas et al. | |
| 2017/0183140 A1 | 6/2017 | Sütterlin et al. | |
| 2018/0100064 A1 | 4/2018 | Aepli et al. | |

FOREIGN PATENT DOCUMENTS

| | | |
|---|---|---|
| CN | 101796099 A | 8/2010 |
| CN | 105269779 A | 1/2016 |
| CN | 105295030 A | 2/2016 |
| EP | 0 469 435 A1 | 2/1992 |
| EP | 2 298 830 A1 | 3/2011 |
| EP | 2 957 598 A1 | 12/2015 |

OTHER PUBLICATIONS

"Polyamides (PA)," Kunststoffe (Excerpt from Abts, *Plastic Knowledge for Beginners*, p. 114-117 (2016) Downloaded Apr. 15, 2018 https://www.kunststoffe.de/themen/basics/technischekunststoffe/polyamide-pa/artikel/polyamide-pa-651963.

European Patent Office, Extended European Search Report in European Patent Application No. 17 15 9179.5 (dated Jun. 26, 2017).

European Patent Office, Notification under Article 94 (3) EPC in European Patent Application No. 17 15 9179.5 (dated Apr. 6, 2020).

U.S. Appl. No. 12/743,097, filed Nov. 12, 2008.

(Continued)

*Primary Examiner* — Gregory Listvoyb

(74) *Attorney, Agent, or Firm* — Leydig, Voit & Mayer, Ltd.

(57) ABSTRACT

The present invention relates to an amorphous or microcrystalline copolyamide (A) containing at least the following monomers: (a) at least one cycloaliphatic diamine; (b) 0.25 to 4.4 mol % of at least one dimeric fatty acid; and (c) 12 to 49.75 mol % of at least one aromatic dicarboxylic acid selected from the group consisting of isophthalic acid, terephthalic acid and naphthalenedicarboxylic acid, and (d) 0 to 37.75 mol % of at least one aliphatic dicarboxylic acid; where the molar proportion of isophthalic acid is at least equal to the molar proportion of terephthalic acid, and where the monomers (b), (c) and optionally (d) add up to 50 mol % and the molar proportions of all the monomers present in the copolyamide (A) add up to 100 mol %. The invention further relates to moulding compounds comprising the copolyamide (A), to mouldings made therefrom and to the use thereof.

14 Claims, 1 Drawing Sheet

(56) References Cited

OTHER PUBLICATIONS

U.S. Appl. No. 13/045,682, filed Mar. 11, 2011.
U.S. Appl. No. 13/186,785, filed Jul. 20, 2011.
U.S. Appl. No. 13/481,451, filed May 25, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/205,667, filed Mar. 12, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/915,031, filed Feb. 26, 2016.
U.S. Appl. No. 14/935,642, filed Nov. 9, 2015.
U.S. Appl. No. 15/105,011, filed Sep. 6, 2016.
U.S. Appl. No. 15/253,506, filed Aug. 31, 2016.
U.S. Appl. No. 15/285,947, filed Oct. 5, 2016.
U.S. Appl. No. 15/385,432, filed Dec. 20, 2016.
U.S. Appl. No. 15/385,519, filed Dec. 20, 2016.
U.S. Appl. No. 15/546,373, filed Jul. 26, 2017.
U.S. Appl. No. 15/729,321, filed Oct. 10, 2017.
U.S. Appl. No. 15/789,069, filed Oct. 20, 2017.
U.S. Appl. No. 15/826,177, filed Nov. 29, 2017.
U.S. Appl. No. 15/895,537, filed Feb. 13, 2018.
U.S. Appl. No. 15/910,877, filed Mar. 2, 2018.
Ministry of Law and Human Rights, Republic of Indonesia, Notification of the results of substantive examination in Indonesian Patent Application No. P-00201801588 (dated Apr. 28, 2021).
China National Intellectual Property Administration, First Office Action in Chinese Patent Application No. 201810179927.4 (dated May 11, 2021).

* cited by examiner

COPOLYAMIDES CONTAINING DIMERIC FATTY ACID AS MONOMER

CROSS-REFERENCE TO RELATED APPLICATION

This patent application claims the benefit of European Patent Application No. 17 159 179.5, filed on Mar. 3, 2017, the disclosure of which is incorporated herein by reference in its entirety for all purposes.

BRIEF SUMMARY OF THE INVENTION

The present invention relates to copolyamides formed from cycloaliphatic diamines, aromatic dicarboxylic acids, dimeric fatty acids and optionally aliphatic dicarboxylic acids. The invention further relates to a moulding compound comprising at least one of said copolyamides, and to mouldings made from said moulding compound. The invention also relates to the use of the mouldings in the automotive, electrical, electronic, domestic, gastronomy, laboratory, sport, leisure, toys and games, decoration, mechanical engineering, measurement technology and control technology sectors.

BACKGROUND OF THE INVENTION

The prior art already describes copolyamides of cycloaliphatic diamines and dimeric fatty acids.

EP 0469 435 A1 relates to amorphous copolyamides composed of a) 50 mol % of at least one cycloaliphatic diamine of the formula I

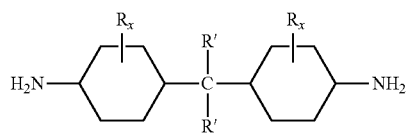

I in which R is an alkyl radical having 1 to 10 carbon atoms, R' is hydrogen or an alkyl radical having 1 to 4 carbon atoms and x is 0 to 4, b) 5 to 25 mol % of a dimerized fatty acid, c) 25 to 45 mol % of at least one aromatic dicarboxylic acid, where the molar sum total of components a) to c) adds up to 100%, and optionally d) 0 to 50 mol %, based on the sum total of a), b) and c), of further polyamide-forming monomers. These copolyamides can easily be used, preferably by injection moulding processes, for production of mouldings which feature high stiffness and impact resistance, a high glass transition temperature and low absorption of moisture, especially for thin-walled mouldings; they can also be processed by extrusion to give stiff tubes or sheaths for optical fibres, for example. In the films sector, they can be processed in combination with other polymers, for example by coextrusion methods.

EP 2 957 598 A1 relates to a composite comprising a matrix material composed of an amorphous polyamide having a glass transition temperature of at least 180° C. The composites according to the invention find use for the production of reinforced components in the sectors of sport, leisure, engineering, electronics, construction, medical technology, transportation and aerospace.

The copolyamides known from the prior art that contain a dimeric fatty acid do not have relatively high viscosities and glass transition temperatures. The reason for this is that the stirrer systems of the autoclaves are limited in torque, which can be caused by the stability of the stirrer system or by the power of the drive motor. Low relative viscosities of polyamides lead to poor mechanical properties for the mouldings produced therefrom.

Moreover, the polyamides from the prior art exhibit high melt viscosities. Polyamides having high melt viscosities are difficult to process; particularly processing to give large parts or to give thin-walled parts is difficult.

BRIEF SUMMARY OF THE INVENTION

Proceeding from this, the problem addressed by the present invention was that of providing copolyamides having dimeric fatty acid as monomer, which have high relative viscosities and glass transition temperatures. In addition, mouldings formed from these copolyamides are to have good mechanical properties, especially good toughness, and have good processability.

This problem is solved by the features of the amorphous or microcrystalline copolyamide (A) described herein, which comprises the following monomers:

(a) at least one cycloaliphatic diamine;

(b) 0.25 to 4.4 mol % of at least one dimeric fatty acid; and (c) 12 to 49.75 mol % of at least one aromatic dicarboxylic acid selected from the group consisting of isophthalic acid, terephthalic acid and naphthalenedicarboxylic acid, and (d) 0 to 37.75 mol % of at least one aliphatic dicarboxylic acid;

where the molar proportion of isophthalic acid is at least equal to the molar proportion of terephthalic acid, and where the monomers (b), (c) and optionally (d) add up to 50 mol % and the molar proportions of all the monomers present in the copolyamide (A) add up to 100 mol %.

A further problem addressed by the present invention is that of providing moulding compounds comprising the copolyamide (A) and optionally also additives (B) and/or further polymers (C).

Preferred embodiments and use according to the invention are also described.

DETAILED DESCRIPTION OF THE INVENTION

Definitions of Terms

Figure 1A:
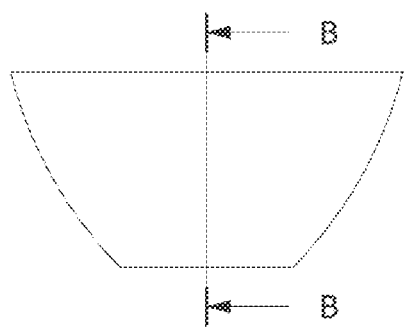
FIG. 1A illustrates a view of a rotationally symmetric dish prepared from a moulding compound in accordance with an embodiment of the invention.

Notations and Abbreviations for Polyamides and their Monomers

In the context of the present invention, the term "polyamide" (abbreviation: PA) is an umbrella term; this encompasses homopolyamides and copolyamides. The chosen notations and abbreviations for polyamides and their monomers correspond to those laid down in ISO Standard 1874-1 (2011, (D)). The abbreviations used therein are used synonymously hereinafter for the IUPAC names of the monomers. More particularly, the following abbreviations for monomers occur in the present application: MACM for bis(4-amino-3-methylcyclohexyl)methane (also referred to as 3,3'-dimethyl-4,4'-diaminodicyclohexylmethane, CAS No. 6864-37-5), TMDC for bis(4-amino-3,5-dimethylcyclohexyl)methane (also referred to as 3,3',5,5'-tetramethyl-4,4'-diaminodicyclohexylmethane, CAS No. 65962-45-0), PACM for bis(4-aminocyclohexyl)methane (also referred to as 4,4'-diaminodicyclohexylmethane, CAS No. 1761-71-3), T for terephthalic acid (CAS No. 100-21-0), I for isophthalic acid (CAS No. 121-95-5), 36 for dimeric fatty acid having 36 carbon atoms (CAS No. 68783-41-5 or 61788-89-4), 12 for dodecanedioic acid (also called 1,10-decanedicarboxylic acid, CAS No. 693-23-2), CHD for cyclohexane-1,4-dicarboxylic acid (CAS No. 1076-97-7) and 12 for laurolactam (CAS No. 947-04-6).

Amorphous or Microcrystalline Polyamides

Amorphous or microcrystalline polyamides, in differential scanning calorimetry (DSC) according to ISO 11357 (2013), at a heating rate of 20 K/min, preferably have a heat of fusion of not more than 50 J/g, more preferably of not more than 25 J/g, most preferably 0 to 22 J/g.

Microcrystalline polyamides are semicrystalline polyamides and therefore have a melting point. However, they have a morphology where the crystallites have such small dimensions that a plaque produced therefrom having a thickness of 2 mm is still transparent, i.e. its transmission of light is at least 75%, measured according to ASTM D 1003-13 (2013).

In the microcrystalline polyamides used for the polyamide moulding compound according to the invention, the melting point measured according to ISO 11357 (2013) is preferably not more than 255° C.

Amorphous polyamides have a lower heat of fusion compared to the microcrystalline polyamides. The amorphous polyamides, in differential scanning calorimetry (DSC) according to ISO 11357 (2013), at a heating rate of 20 K/min, preferably have a heat of fusion of not more than 5 J/g, more preferably of not more than 3 J/g, most preferably of 0 to 1 J/g.

Amorphous polyamides do not have a melting point owing to their amorphicity.

The light transmittance of the amorphous or microcrystalline polyamides measured to ASTM D 1003-13 (2013) on plaques having a thickness of 2 mm is at least 75%, preferably at least 80% and more preferably at least 90%.

Dimeric Fatty Acid

In the context of the present invention, dimeric fatty acids (b) have at least 28 carbon atoms. They are obtained by dimerization of unsaturated monocarboxylic acids to give dicarboxylic acids, the dimerization preferably being conducted by catalytic means. Dimeric fatty acids according to the present invention are dicarboxylic acids.

Aliphatic Dicarboxylic Acid

The aliphatic dicarboxylic acids (d) in the context of the present invention are understood to mean dicarboxylic acids having 6 to 22 carbon atoms. These may be linear, branched or cycloaliphatic, and are in saturated form.

Figures of Amount for the Monomers

The copolyamides according to the invention contain solely dicarboxylic acids and diamines. The molar amounts thereof add up to 50 mol % for the sum total of all diamines and 50 mol % for the sum total of all dicarboxylic acids, and the sum total of the amounts of diamines and dicarboxylic acid is 100% for the copolyamide.

In the figures of amount for the dicarboxylic acids and diamines in the copolyamides, the sum total of the molar amount of all diamines is essentially equal to the sum total of the molar amount of all dicarboxylic acids. "Essentially equal" means a maximum excess of the dicarboxylic acids or the diamines of 3%, meaning that the molar ratio of dicarboxylic acids to diamines is 1.03:1 to 1:1.03. Preference is given to a maximum excess of the dicarboxylic acids or the diamines of 2%, meaning that the molar ratio of dicarboxylic acids to diamines is 1.02:1 to 1:1.02.

The excess serves to compensate for losses of monomer and/or to control the relative viscosity of the polyamide and hence the molar mass.

The figures of amount with regard to the monomers should be understood such that a corresponding molar ratio of these monomers used in the polycondensation is also reflected in the copolyamides prepared by polycondensation in this way.

General Details Relating to Figures of Amount

The moulding compounds according to the present invention preferably contain solely components (A), (B) and (C), the proviso being applicable that components (A), (B) and (C) add up to 100% by weight. The fixed ranges for the figures of amount for the individual components (A), (B) and (C) should be understood such that an arbitrary amount for each of the individual components may be selected within the specified ranges, provided that the strict proviso that the sum total of all components (A) to (C) is 100% by weight is fulfilled.

The figures of amount for the diamines and dicarboxylic acids present in the copolyamide (A) add up to 50 mol % in each case. All the monomers present in the copolyamide (A) add up to 100 mol %. The fixed ranges for the figures of amount for the individual monomers should be understood such that an arbitrary amount for each of the individual components may be selected within the specified ranges, provided that the strict proviso that the sum total of all the monomers present in the copolyamide (A) is 100 mol % is fulfilled.

Moulding Compound

The moulding compound according to the present invention is based on the copolyamide (A) and preferably contains it to an extent of at least 70% by weight, more preferably to an extent of at least 80% by weight and especially preferably to an extent of at least 88% by weight.

Toughness

In the context of the present invention, toughness is assessed by elongation at break, impact resistance and or notched impact resistance.

Translucence

In the context of the present invention, a translucent moulding compound is understood to mean a moulding compound having a light transmittance between 40% and 75%, measured on plaques of thickness 2 mm to ASTM D 1003-13 (2013).

Opaque

In the context of the present invention, an opaque moulding compound is understood to mean a moulding compound having a light transmittance of not more than 40%, measured on plaques of thickness 2 mm to ASTM D 1003-13 (2013).

Dielectric Loss Factor

In the context of the present invention, the "dielectric loss factor" (=tan δ) of the complex relative permittivity (=$\underline{\varepsilon}_r$) is understood to mean a measure of the energy which is converted to heat in a material within an electric alternating field and is thus lost from the field.

The "dielectric loss factor" (=tan δ) of the complex relative permittivity ($\underline{\varepsilon}_r$) is defined according to IEC 60250-1 (1969) as $$\tan \delta = \varepsilon_r''/\varepsilon_r'$$

and the complex relative permittivity ($\underline{\varepsilon}_r$) as $$\underline{\varepsilon}_r = \varepsilon_r' - j\varepsilon_r''$$

where $\varepsilon_r''$ is the imaginary part of the complex relative permittivity $\underline{\varepsilon}_r$, $\varepsilon_r'$ is the real part of the complex relative permittivity $\underline{\varepsilon}_r$ and j is the imaginary unit.

Copolyamide (A)

In the preferred embodiments of the present invention which follow, the amorphous or microcrystalline copolyamide is specified in detail. These embodiments are also preferred for the moulding compound according to the invention, the moulding according to the invention and the uses according to the invention.

The at least one amorphous or microcrystalline copolyamide (A) contains at least the following monomers:
(a) at least one cycloaliphatic diamine;
(b) 0.25 to 4.4 mol % of at least one dimeric fatty acid; and
(c) 12 to 49.75 mol % of at least one aromatic dicarboxylic acid; and
(d) 0 to 37.75 mol % of at least one aliphatic dicarboxylic acid.

The at least one cycloaliphatic diamine component (a), in a preferred embodiment, is selected from the group consisting of bis(4-amino-3-methylcyclohexyl)methane, bis(4-aminocyclohexyl)methane, bis(4-amino-3-ethylcyclohexyl)methane, bis(4-amino-3,5-dimethylcyclohexyl)methane, norbornane-2,6-diamine or 2,6-bis(aminomethyl)norbornane, 1,3-diaminocyclohexane, 1,4-diaminocyclohexane, isophoronediamine, 1,3-bis(aminomethyl)cyclohexane, 1,4-bis(aminomethyl)cyclohexane, 2,2-(4,4'-diaminodicyclohexyl)propane and mixtures thereof; and In a preferred embodiment of the present invention, the cycloaliphatic diamine (a) is present in the at least one amorphous or microcrystalline copolyamide (A) at 40 to 50 mol %, preferably at 48 to 50 mol % and especially preferably at exactly 50 mol %.

If less than 50 mol % of cycloaliphatic diamine is present in the copolyamide (A), the diamine component is made up to 50 mol % with 0 to 10 mol % and preferably with 0 to 2 mol % of unbranched or branched linear aliphatic diamine e).

Preferably, the copolyamide (A) is amorphous.

The dimeric fatty acid (b), in a preferred embodiment of the present invention, is a dimeric fatty acid having 36 or 44 carbon atoms, where the dimeric fatty acid (b) more preferably has 36 carbon atoms.

In a preferred embodiment of the present invention, the dimeric fatty acid (b) is present in the at least one amorphous or microcrystalline copolyamide (A) at 1 to 4.2 mol %, preferably at 1.5 to 3.5 mol % and especially preferably at 1.7 to 3.0 mol %.

The dimeric fatty acid (b) in the copolyamide (A) according to the invention preferably has an acid number in the range of 145-210 mg KOH/g, especially preferably in the range of 192-200 mg KOH/g. Its content of monofunctional acid is not more than 5%, its content of bifunctional acid at least 88%, and its content of trifunctional acid not more than 4%. The acid number, or the content of the various acids, is measured according to AOCS Te 1a-64 or AOCS Tf 5-91. Examples of useful products include those having 36 carbon atoms as obtainable under the Pripol brand name from Croda, especially Pripol 1013, 1012, 1009, 1006, or under the Empol brand name from Cognis, especially Empol 1012, 1016 or 1062, or under the Radiacid 0975 brand name from Oleon, or products having 44 carbon atoms, for example Pripol 1004 from Croda.

Preferably, the dimeric fatty acid (b) of the copolyamide (A) according to the invention is partly saturated, more preferably fully saturated.

The at least one aromatic dicarboxylic acid group (c), in a preferred embodiment of the present invention, is selected from the group consisting of isophthalic acid, terephthalic acid and mixtures thereof.

In a preferred embodiment of the present invention, the at least one aromatic dicarboxylic acid (d) is present in the at least one amorphous or microcrystalline copolyamide (A) at 14 to 44 mol %, preferably at 23 to 38.5 mol % and more preferably at 25.5 to 33 mol %.

In another preferred embodiment of the present invention, the aromatic dicarboxylic acid (c) is isophthalic acid and preferably also terephthalic acid, and the proportion of isophthalic acid based on the sum total of all the monomers in the copolyamide (A) is 6 to 49.75 mol %, preferably 7 to 44 mol %, more preferably 11.5 to 27 mol % and especially preferably 12.75 to 20.55 mol %.

In a further preferred embodiment of the present invention, the aromatic dicarboxylic acid (c) is isophthalic acid and preferably also terephthalic acid, and the proportion of terephthalic acid based on the sum total of all the monomers in the copolyamide (A) is 0 to 24.85 mol %, preferably 0 to 22 mol %, more preferably 11.5 to 19.25 mol % and especially preferably 12.75 to 16.65 mol %.

In another preferred embodiment of the present invention, the aromatic dicarboxylic acid (c) is isophthalic acid and preferably also terephthalic acid, and the proportion of isophthalic acid based on the sum total of all the monomers in the copolyamide (A) is 6 to 49.75 mol %, preferably 7 to 44 mol %, more preferably 11.5 to 27 mol % and especially preferably 12.75 to 20.55 mol %, and the proportion of terephthalic acid based on the sum total of all the monomers in the copolyamide (A) is 0 to 24.85 mol %, preferably 0 to 22 mol %, more preferably 11.5 to 19.25 mol % and especially preferably 12.75 to 16.65 mol %.

In another preferred embodiment of the present invention, the at least one aliphatic dicarboxylic acid (d) is selected from the group consisting of hexane-1,6-dioic acid, nonane-1,9-dioic acid, decane-1,10-dioic acid, undecane-1,11-dioic acid, dodecane-1,12-dioic acid, tridecane-1,13-dioic acid, tetradecane-1,14-dioic acid, octadecane-1,18-dioic acid, cyclohexane-1,3-dicarboxylic acid, cyclohexane-1,4-dicarboxylic acid and mixtures thereof.

In a preferred embodiment of the present invention, the at least one aliphatic dicarboxylic acid (d) is present in the at least one amorphous or microcrystalline copolyamide (A) at 5 to 35 mol %, preferably at 10 to 25.5 mol % and especially preferably at 15 to 22.8 mol %.

In a further preferred embodiment of the present invention, the copolyamide (A) is selected from the group consisting of TMDCI/TMDC12/TMDC36, TMDCI/TMDC14/TMDC36, TMDCI/TMDC9/TMDC36, TMDCI/TMDCCHD/TMDC36, TMDCI/TMDC11/TMDC36, TMDCI/TMDC13/TMDC36, TMDCI/TMDC18/TMDC36, TMDCI/TMDCT/TMDC36, TMDCI/TMDC36, TMDCI/TMDCT/TMDC12/TMDC36, TMDCI/TMDCT/TMDC14/TMDC36, TMDCI/TMDCT/TMDC18/TMDC36, TMDCI/TMDCT/TMDC9/TMDC36, TMDCI/TMDCT/TMDCCHD/TMDC36, TMDCI/TMDCT/TMDC12/TMDCCHD/TMDC36 and mixtures thereof, where TMDC may be replaced wholly or partly by MACM, and/or where the dimeric fatty acid having 36 carbon atoms may be replaced wholly or partly by a dimeric fatty acid having 44 carbon atoms.

In a further preferred embodiment of the present invention, the copolyamide (A) is selected from the group consisting of TMDCI/TMDC12/TMDC36, TMDCI/TMDC14/TMDC36, TMDCI/TMDC18/TMDC36, TMDCI/TMDCT/TMDC36, TMDCI/TMDC36, TMDCI/TMDCT/TMDC12/TMDC36, TMDCI/TMDCT/TMDC14/TMDC36, TMDCI/TMDCT/TMDC18/TMDC36 and mixtures thereof, where TMDC may be replaced wholly or partly by MACM, and/or where the dimeric fatty acid having 36 carbon atoms may be replaced wholly or partly by a dimeric fatty acid having 44 carbon atoms.

In a further particularly preferred embodiment of the present invention, the copolyamide (A) is selected from the group consisting of TMDCI/TMDC12/TMDC36, TMDCI/TMDC14/TMDC36, TMDCI/TMDCT/TMDC36, TMDCI/TMDC36, TMDCI/TMDCT/TMDC12/TMDC36, TMDCI/TMDCT/TMDC14/TMDC36 MACMI/MACM12/MACM36, MACMI/MACM14/MACM36, MACMI/MACMT/MACM36, MACMI/MACM36, MACMI/MACMT/MACM12/MACM36, MACMI/MACMT/MACM14/MACM36 and mixtures thereof.

In a preferred embodiment of the present invention, the glass transition temperature of the at least one amorphous or microcrystalline copolyamide (A) is at least 155° C., preferably at least 170° C., especially preferably at least 180° C., more preferably at least 190° C. and most preferably at least 200° C., measured according to ISO 11357-2 and -3 (2013) on pellets having a water content below 0.1% by weight.

In a further preferred embodiment of the present invention, the dielectric loss factor tan δ of the at least one amorphous or thermoplastic copolyamide (A) is not more than $8.3 \times 10^{-3}$, preferably $8.0 \times 10^{-3}$, more preferably not more than $7.0 \times 10^{-3}$ and especially preferably not more than $6.5 \times 10^{g}$.

In another preferred embodiment of the present invention, the light transmittance of the at least one amorphous or microcrystalline copolyamide (A) measured according to ASTM D 1003-13 (2013) on a plaque having a thickness of 2 mm produced therefrom is still at least 75%, preferably at least 80% and more preferably at least 90%.

In another preferred embodiment of the present invention, the at least one amorphous or microcrystalline copolyamide (A) comprises at least the following monomers:
(a) at least one cycloaliphatic diamine component selected from the group consisting of bis(4-amino-3-methylcyclohexyl)methane, bis(4-aminocyclohexyl)methane, bis(4-amino-3-ethylcyclohexyl)methane, bis(4-amino-3,5-dimethylcyclohexyl)methane, norbornane-2,6-diamine or 2,6-bis(aminomethyl)norbornane, 1,3-diaminocyclohexane, 1,4-diaminocyclohexane, isophoronediamine, 1,3-bis(aminomethyl)cyclohexane, 1,4-bis(aminomethyl)cyclohexane, 2,2-(4,4'-diaminodicyclohexyl)propane and mixtures thereof; and
(b) at least one dimeric fatty acid selected from the group consisting of dimeric fatty acids having 36 or 44 carbon atoms and mixtures thereof; and
(c) at least one aromatic dicarboxylic acid selected from the group consisting of isophthalic acid, terephthalic acid, naphthalenedicarboxylic acid and mixtures thereof; and
(d) at least one aliphatic dicarboxylic acid selected from the group consisting of hexane-1,6-dioic acid, nonane-1,9-dioic acid, decane-1,10-dioic acid, undecane-1,11-dioic acid, dodecane-1,12-dioic acid, tridecane-1,13-dioic acid, tetradecane-1,14-dioic acid, octadecane-1,18-dioic acid, cyclohexane-1,3-dicarboxylic acid, cyclohexane-1,4-dicarboxylic acid and mixtures thereof.

In another preferred embodiment of the present invention, the at least one amorphous or microcrystalline copolyamide (A) comprises at least the following monomers:
(a) at least one cycloaliphatic diamine component selected from the group consisting of bis((4-amino-3-methylcyclohexyl)methane, bis((4-aminocyclohexyl)methane, bis((4-amino-3,5-dimethylcyclohexyl)methane and mixtures thereof and is preferably selected from the group consisting of bis((4-amino-3-methylcyclohexyl)methane, bis((4-amino-3,5-dimethylcyclohexyl)methane and mixtures thereof; and
(b) at least one dimeric fatty acid having 36 carbon atoms; and
(c) at least one aromatic dicarboxylic acid selected from the group consisting of isophthalic acid, terephthalic acid and mixtures thereof; and optionally
(d) at least one aliphatic dicarboxylic acid selected from the group consisting of dodecane-1,12-dioic acid, tetradecane-1,14-dioic acid, octadecane-1,18-dioic acid and mixtures thereof.

In an especially preferred embodiment of the present invention, the at least one amorphous or microcrystalline copolyamide (A) comprises at least the following monomers:
(a) 40 to 50 mol %, preferably 48 to 50 mol % and especially preferably exactly 50 mol % of at least one cycloaliphatic diamine;
(b) 1 to 4.2 mol % of at least one dimeric fatty acid; and
(c) 14 to 44 mol % of at least one aromatic dicarboxylic acid;
(d) 5 to 35 mol % of at least one aliphatic dicarboxylic acid; where
the proportions of all the monomers present in the copolyamide (A) add up to 100 mol %.

In another especially preferred embodiment of the present invention, the at least one amorphous or microcrystalline copolyamide (A) comprises at least the following monomers:
(a) 40 to 50 mol %, preferably 48 to 50 mol % and especially preferably exactly 50 mol % of at least one cycloaliphatic diamine;
(b) 1.5 to 3.5 mol % of at least one dimeric fatty acid; and
(c) 23 to 38.5 mol % of at least one aromatic dicarboxylic acid;
(d) 10 to 25.5 mol % of at least one aliphatic dicarboxylic acid; where the proportions of all the monomers present in the copolyamide (A) add up to 100 mol %.

In another especially preferred embodiment of the present invention, the at least one amorphous or microcrystalline copolyamide (A) comprises at least the following monomers:
- (a) 40 to 50 mol %, preferably 48 to 50 mol % and especially preferably exactly 50 mol % of at least one cycloaliphatic diamine;
- (b) 1.7 to 3.0 mol % of at least one dimeric fatty acid; and
- (c) 25.5 to 33.3 mol % of at least one aromatic dicarboxylic acid;
- (d) 15 to 22.8 mol % of at least one aliphatic dicarboxylic acid; where the proportions of all the monomers present in the copolyamide (A) add up to 100 mol %.

In one embodiment, the copolyamide does not contain any monomers apart from the monomers (a) to (e).

The relative viscosity of the amorphous or microcrystalline copolyamides (A), in a preferred embodiment of the present invention, is 1.40 to 2.15, preferably 1.45 to 1.90, more preferably 1.50 to 1.80, measured in a solution of 0.5 g of polyamide in 100 ml of m-cresol at 20° C.

Moulding Compound and Moulding Made Therefrom

The moulding compound according to the present invention may, as well as the copolyamide (A), also comprise additives (B) and further polymers (C) different from the copolyamide (A) and from the additive (B).

In a further preferred embodiment of the present invention, the additives (B) are selected from the group consisting of inorganic and organic stabilizers, especially antioxidants, antiozonants and light stabilizers, condensation catalysts, chain regulators, lubricants, demoulding agents, separating agents, chain-extending additives, dyes, markers, inorganic pigments, organic pigments, optical brighteners, natural sheet silicate, synthetic sheet silicate, nanoscale fillers having a maximum particle size of 100 nm.

In a further preferred embodiment of the present invention, the polymers (C) are preferably selected from the group consisting of PA 66, PA 69, PA 610, PA 612, PA 614, PA 1010, PA 1212, PA 1012, PA 1012, PA 1210 PA 6/12, PA 11, PA 12, polyetheramides, polyetheresteramides, polyaryl ethers, amorphous polyamides, impact modifiers and cycloolefin copolymers.

More preferably, the polymer (C) is selected from the group consisting of PA 66, PA 612, PA 1010, PA 11, PA 12, polyaryl ethers, amorphous polyamides, impact modifiers and cycloolefin copolymers.

In the case of microwave-resistant mouldings, the other portions of the moulding compound (not more than 10% by weight) may quite generally consist of any microwave-resistant materials. Preference is given to nylon-10,10, nylon-11, nylon-12, impact modifiers and/or cycloolefin copolymers.

The microwave-resistant mouldings are especially selected from the group consisting of articles such as dishware, vessels, containers, dishes, pots, cups, beakers, plates, lids, sauce boats, flasks or covering trays, undertrays or serving trays for the household, gastronomy, laboratory and/or industry.

In a further embodiment of the present invention, the microwave-resistant moulding has a wall thickness in the range from 0.05 to 5.0 mm, preferably 0.1 to 4.5 mm and more preferably 1.0 to 4.0 mm.

A preferred moulding compound according to the present invention has the following composition:

70% to 100% by weight, preferably 80% to 99.99% by weight and more preferably 88.0 to 99.8% by weight of copolyamide (A), and 0% to 10% by weight, preferably 0.01% to 5% by weight and more preferably 0.1 to 2.0% by weight of additive (B), 0% to 20% by weight, preferably 0% to 15% by weight and more preferably 0.1 to 10% by weight of polymer (C), where components (A) to (C) add up to 100% by weight.

In another preferred embodiment of the present invention, the light transmittance of the at least one moulding compound measured according to ASTM D 1003-13 (2013) on a plaque having a thickness of 2 mm produced therefrom is still at least 75%, preferably at least 80% and more preferably at least 90%.

However, the moulding compound according to the invention is not necessarily transparent. Depending on the additives (B) present therein and the further polymer (C), the moulding compound may also be translucent or opaque. Preferably, the moulding compound according to the invention is transparent or translucent.

In a preferred embodiment of the present invention, the glass transition temperature of the at least one moulding compound is at least 155° C., preferably at least 170° C., especially preferably at least 180° C., more preferably at least 190° C. and most preferably at least 200° C., measured according to ISO 11357-2 and -3 (2013) on pellets having a water content below 0.1% by weight.

In a further preferred embodiment of the present invention, the dielectric loss factor tan δ of the at least one moulding compound is not more than $8.3 \times 10^{-3}$, preferably not more than $8.0 \times 10^{-3}$, especially preferably not more than $7.0 \times 10^{-3}$ and more preferably not more than $6.5 \times 10^{g}$.

In another preferred embodiment of the present invention, mouldings formed from the amorphous or microcrystalline copolyamides (A) have very good mechanical properties, especially high impact resistances. The notched impact resistance determined according to ISO 179/2 at 23° C. is preferably >6 kJ/m$^2$, more preferably >8 kJ/m$^2$, especially preferably >10 kJ/m$^2$. The impact resistance determined according to ISO 179/2 at 23° C. is preferably >130 kJ/m$^2$, more preferably >250 kJ/m$^2$, especially preferably >300 kJ/m$^2$.

Uses of the Moulding Compounds and the Mouldings

The invention further relates to uses of the moulding compounds comprising the at least one amorphous or microcrystalline copolyamide (A) and optionally additives (B) and optionally a further polymer (C) different from the copolyamide (A) and the additive (B).

The moulding compound has the features as specified above.

A preferred use of the moulding compound according to the invention is in use for production of mouldings.

Another preferred embodiment of the present invention relates to the use of the mouldings in the automotive, electrical, electronic, domestic, gastronomy, laboratory, sport, leisure, toys and games, decoration, packaging, optics, mechanical engineering or measurement technology and control technology sector.

General Method for Preparation of the Amorphous or Microcrystalline Copolyamides The amorphous or microcrystalline copolyamides are prepared in a manner known per se, for example in standard commercial, stirrable pressure autoclaves having a reservoir vessel and a reaction vessel.

The reservoir vessel is initially charged with deionized water, and the monomers and any additives are added. This is followed by repeated inertization with nitrogen gas. The mixture is heated up to 180 to 230° C. while stirring under the pressure which is established in order to obtain a homogeneous solution. This solution is pumped through a sieve into the reaction vessel, where it is heated up to the desired reaction temperature of 260 to 330° C. at a pressure of not more than 30 bar. The mixture is kept at the reaction temperature in the pressure phase for 2 to 4 hours. In the subsequent expansion phase, the pressure is reduced to atmospheric pressure within 1 to 2 hours, in the course of which the temperature can fall slightly. In the subsequent degassing phase, the mixture is kept at a temperature of 270 to 330° C. at atmospheric pressure for 0.5 to 2.5 hours. The polymer melt is discharged in strand form, cooled down in a water bath at 15 to 80° C. and pelletized. The pelletized material is dried at 80 to 120° C. under nitrogen or under reduced pressure to a water content of less than 0.1% by weight.

Suitable catalysts for acceleration of the polycondensation reaction are phosphorus acids, for example $H_3PO_2$, $H_3PO_3$, $H_3PO_4$, salts thereof or organic derivatives. The catalysts are added in the range from 0.01% to 0.5% by weight, preferably 0.03% to 0.1% by weight, based on the polyamide.

Suitable defoamers for avoidance of foam formation during the degassing are aqueous 10% emulsions which contain silicones or silicone derivatives and are used in amounts of 0.01% to 1.0% by weight, preferably 0.01% to 0.10% by weight, based on the polyamide.

The relative viscosity and hence the molar mass can be adjusted in a manner known per se, for example via monofunctional amines or carboxylic acids and/or difunctional diamines and dicarboxylic acids as chain transfer agents. Preferred monofunctional chain transfer agents for the copolyamides according to the invention are benzoic acid, acetic acid, propionic acid, butyric acid, valeric acid, caproic acid, lauric acid, stearic acid, 2-ethylhexanoic acid, cyclohexanecarboxylic acid, propylamine, butylamine, pentylamine, hexylamine, 2-ethylhexylamine, n-octylamine, n-nonylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, aniline or triacetonediamine. The chain transfer agents can be used individually or in combination. It is also possible to use other monofunctional compounds that can react with an amino or acid group as chain transfer agents, such as anhydrides, isocyanates, acid halides, amides or esters. The customary use amount for the monofunctional chain transfer agents is 5 to 200 mmol per kg of copolyamide.

The glass transition temperature (Tg) of the amorphous or microcrystalline copolyamides (A) is at least 155° C., preferably 170 to 235° C., especially preferably 180 to 230° C., more preferably 190 to 225° C. and most preferably 200 to 220° C., measured according to ISO 11357-2 and -3 (2013) on pellets having a water content below 0.1% by weight.

Production of the Microwave-Resistant Mouldings

The microwave-resistant mouldings can be produced via the standard processing techniques for polyamide moulding compounds. Particular preference is given to processing via injection moulding techniques.

The processing of the amorphous or microcrystalline copolyamides by injection moulding is effected in conventional injection moulding machines having a standard 3-zone screw at barrel temperatures of 250 to 330° C., and a temperature below 100° C. may also be chosen for the intake and a temperature profile that rises and ascends from the intake to the nozzle may be used. The mould temperature is set to 120 to 180° C., preferably 140 to 170° C.

The examples which follow are intended to elucidate the subject-matter of the invention in detail, without wishing to restrict it to the specific embodiments shown here.

1 Test Methods

In the context of this application, the following test methods were used:

Relative Viscosity

Relative viscosity was determined according to ISO 307 (2007) at 20° C. For this purpose, 0.5 g of polymer pellets was weighed out in 100 ml of m-cresol, and the relative viscosity (RV) was calculated as $RV=t/t_0$ in accordance with Section 11 of the standard.

Glass Transition Temperature (Tg)

Glass transition temperature was determined according to ISO 11357-2 and -3 (2013) on pellets having a water content below 0.1% by weight.

Differential scanning calorimetry (DSC) was conducted at a heating rate of 20 K/min in each of the two heating runs. After the first heating run, the sample was quenched in dry ice. The glass transition temperature (Tg) was determined in the second heating run. The midpoint of the glass transition region which was reported as the glass transition temperature (Tg) was determined by the "half-height" method.

Tensile Modulus of Elasticity

ISO 527 with a pulling speed of 1 mm/min

ISO tensile specimen, standard: ISO/CD 3167, A1 type, 170×20/10×4 mm, temperature: 23° C.

Breaking Strength and Elongation at Break

The determination of breaking strength and elongation at break was conducted according to ISO 527 at 23° C. with a pulling speed of 5 mm/min in the case of reinforced materials using an ISO tensile specimen (mass 170×20/10×4 mm), produced according to the standard ISO/CD 3167.

Charpy Impact Resistance

The determination of Charpy impact resistance was conducted according to ISO 179/2*eU (*2=instrumented) at 23° C. using an ISO test specimen, B1 type (mass 80×10×4 mm), produced according to the standard ISO/CD 3167.

Charpy Notched Impact Resistance

Charpy notched impact resistance was conducted according to ISO 179/2*eA (*2=instrumented) at 23° C. using an ISO test specimen, B1 type (mass 80×10×4 mm), produced according to the standard ISO/CD 3167.

Light Transmittance

Light transmittance was determined at 23° C. according to ASTM D 1003-13 (2013) on 60×60 mm plaques (length× width) of thickness 2 mm with a film gate in a "Haze Gard plus" from Byk Gardner with CIE illuminant C. The light transmittance value was reported in % of the quantity of incident light.

Dielectric Loss Factor

The dielectric loss factor tan δ is measured according to IEC 61189-2-721 (2015) on 80×80×3 mm plaques with a film gate using a split post dielectric resonator (SPDR) from QWED, Poland, and the driver software Microwave Q-Meter 1.5.11 (brochure including information relating to measurement available at www.qwed.eu). The measurement frequency is 2.45 GHz, the measurement temperature 23° C.

Microwave Oven Test

The microwave oven test was conducted on rice dishes, the production of which is described under 3.2. These rice dishes were stored in water at 95° C. for 14 days, removed directly before the test, dried with a cotton cloth and positioned unfilled in the middle of the base area of the cooking space of a microwave oven. The microwave used was the commercial Samsung CM1919A microwave, which does not need a turntable. The maximum power of the microwave is 1850 watts. The operating frequency is 2.45 GHz. The cooking space has the dimensions 370×370×190 mm (width×depth×height). After the door had been closed, the microwave oven was started immediately, using the maximum power of 1850 watts.

After 120 seconds had passed, the rice dish was removed and examined visually for damage such as warpage, partly molten sites or blister formation. Five dishes were tested in each case; if damage occurred in just one of the dishes, the test was considered to have been failed.

Of rice dishes made from materials that passed the 120 s microwave test, a further 5 dishes were tested for selected examples or comparative examples, measuring the time before the first damage such as warpage, partly molten sites or blister formation was apparent through the window of the microwave oven. The arithmetic mean from the 5 times measured was reported.

2 Starting Materials

TABLE 1

Monomers used in the examples and comparative examples

| Monomer | CAS No. | Melting range [° C.] | Trade name | Manufacturer/supplier |
|---|---|---|---|---|
| Bis(4-amino-3,5-dimethylcyclohexyl)methane | 65962-45-0 | — | — | BASF SE, Germany |
| Bis(4-amino-3-methylcyclohexyl)methane | 6864-37-5 | −7 to −0.6* | Laromin C260 | BASF SE, Germany |
| Dimeric fatty acid C36 | 68783-41-5 | — | Radiacid 0975 | OLEON N.V., Belgium |
| Terephthalic acid | 100-21-0 | >400 | — | GMS - Chemie-Handelsges.m.b.H., Germany |
| Isophthalic acid | 121-91-5 | 345 to 348 | — | Flint Hills Resources, Switzerland |
| Nonane-1,9-dioic acid | 123-99-9 | 101 to 102 | — | Emery Oleochemicals GmbH, Germany |
| Undecane-1,11-dioic acid | 1852-04-6 | 113 to 114 | — | Cathay Biotechnology Ltd., China |
| Dodecane-1,12-dioic acid | 693-23-2 | 128 to 130 | — | Cathay Biotechnology Ltd., China |
| Tridecane-1,13-dioic acid | 505-52-2 | 113 to 116 | — | Cathay Biotechnology Ltd., China |
| Cyclohexane-1,4-dicarboxylic acid | 1076-97-7 | 163 to 169 | — | Eastman Chemicals Company, USA |

*freezing range according to ASTM D1015-55.

3 Examples and Comparative Examples 3.1 Preparation of the Copolyamide According to Example 1

There follows an elucidation of a copolyamide according to the invention using the PA TMDCI/TMDCT/TMDC12/TMDC36 used in Example 1:

The charge vessel of a 300 l pressure autoclave was initially charged with 30 kg of deionized water, and 6.82 kg of isophthalic acid, 6.82 kg of terephthalic acid, 13.51 kg of dodecane-1,12-dicarboxylic acid and 3.30 kg of dimeric fatty acid (Radiacid 0975 with 36 carbon atoms) were stirred in. Thereafter, 39.54 kg of bis(4-amino-3,5-dimethylcyclohexyl)methane (TMDC), 20 g of Antifoam RD 10% by weight emulsion as defoamer and, finally, 80 g of benzoic acid as chain transfer agent were added. The procedure thereafter was as follows:

After inertization 10 times, the mixture was heated up to 210° C. The homogeneous solution was pumped through a sieve into the reaction vessel at 210° C.

While stirring, the mixture was heated up to 300° C. therein and kept in the pressure phase at 20 bar for 5 hours. Within 1.5 hours, the mixture was expanded to atmospheric pressure and then degassed at 300° C. for 1 hour.

The polymer melt was discharged, cooled down in a water bath (20° C.) and pelletized. The pelletized material was dried to a water content of below 0.1% by weight at 100° C. under reduced pressure (30 mbar).

The relative viscosity of the product was 1.53, the glass transition temperature was 212° C. and the light transmittance at 2 mm was 92.9%.

3.2 Production of the Test Specimens

Rice Dishes

The rice dishes were produced in an injection moulding machine from Ferromatik Milacron, model: K85D-S/2F, with a 40 mm standard 3-zone screw. Ascending barrel temperatures of 280 to 320° C. and an intake temperature of 40° C. were set. The mould temperature was set to 160° C.

Figure 1B:
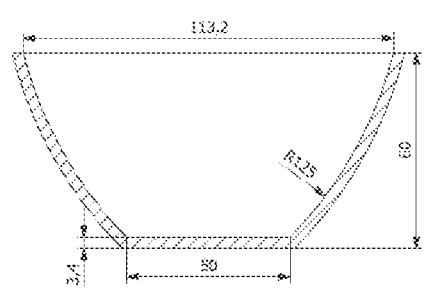
FIG. 1B illustrates another view of a rotationally symmetric dish prepared from a moulding compound in accordance with an embodiment of the invention.
Figure 1C:
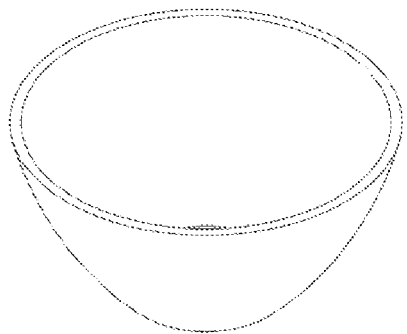
FIG. 1C illustrates a further view of a rotationally symmetric dish prepared from a moulding compound in accordance with an embodiment of the invention.
Figure 1D:
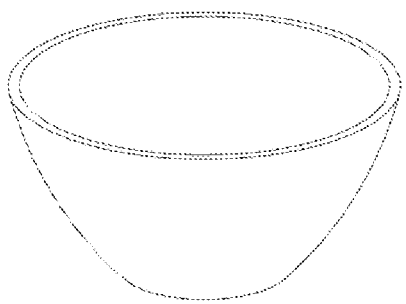
FIG. 1D illustrates yet another view of a rotationally symmetric dish prepared from a moulding compound in accordance with an embodiment of the invention.

The dimensions of the rotationally symmetric dish (see FIG. 1) are:

Internal diameter at the top: 113.2 mm

Internal diameter at the bottom: 50 mm

Radius: 125 mm

Height: 60 mm

Wall thickness: 3.4 mm

Plaques

The 80×80×3 mm plaques with film gate were produced in an injection moulding machine from Arburg, model: Allrounder 420 C 1000-250 with a 25 mm standard 3-zone screw. From the intake to the nozzle, ascending and descending barrel temperatures of 310/320/325/325/315/305° C. were used. The mould temperature was set to 160° C.

The 60×60×2 mm plaques with film gate for determination of light transmittance were produced as described above, except using a polished mould.

The plaques were used in the dry state; for this purpose, they were stored in a dry environment, i.e. over silica gel, at room temperature for at least 48 h after injection moulding.

3.3 Results

Table 2 below shows Example 1 and Comparative Examples 2 and 3.

TABLE 2

Example 1 and Comparative Examples 2 and 3.

|  | Unit | Example 1 | Comparative Examples 2 | Comparative Examples 3 |
|---|---|---|---|---|
| Monomers | | | | |
| TMDC | mol % | — | 50 | — |
| MACM | mol % | 50 | — | 50 |
| Dimeric fatty acid C36 | mol % | 2 | 9.5 | 9.5 |
| Isophthalic acid | mol % | 14 | 40.5 | 40.5 |
| Terephthalic acid | mol % | 14 | — | — |
| Dodecane-1,12-dioic acid | mol % | 20 | — | — |
| Measured values | | | | |
| Stall torque* | Nm | 120 | 120 | 120 |
| Relative viscosity (RV)** | — | 1.62 | 1.37 | 1.38 |
| Glass transition temperature | ° C. | 206 | 206 | 195 |
| Tensile modulus of elasticity | MPa | 2150 | 2380 | 2270 |
| Breaking strength | MPa | 64 | 87 | 70 |
| Elongation at break | % | 57 | 7 | 14 |
| Charpy impact resistance 23° C. | kJ/m$^2$ | 342 | 105 | 312 |
| Charpy notched impact resistance 23° C. | kJ/m$^2$ | 11 | 5 | 5 |
| Dielectric loss factor tan δ | [10^−3] | 8.15 | 4.38 | 6.20 |
| Light transmittance at 2 mm | % | 92.8 | 92.8 | 93.3 |
| Microwave oven test*** | 120 s | + | + | + |
|  | s | 170 | 222 | 130 |

*Stall torque (120 Nm) of the stirrer
***+ passed

Table 3 below shows Examples 4 to 11 and Comparative Examples 12 and 13.

TABLE 3

Examples 4 to 11 and Comparative Examples 12 and 13.

|  | Unit | 4 | 5 | 6 | 7 | 8 | 9 | 10 | 11 | 12 | 13 |
|---|---|---|---|---|---|---|---|---|---|---|---|
|  |  | Examples |  |  |  |  |  |  |  | Comparative Examples |  |
| Monomers | | | | | | | | | | | |
| TMDC | mol % | 50 | 50 | — | — | — | — | — | — | — | — |
| MACM | mol % | — | — | 50 | 50 | 50 | 50 | 50 | 50 | 50 | 50 |
| Dimeric fatty acid C36 | mol % | 2 | 2 | 2 | 2 | 2 | 2 | 2 | 4 | — | 50 |
| Isophthalic acid | mol % | 14 | 28 | 14 | 28 | 28 | 14 | 14 | 14 | 13.5 | — |
| Terephthalic acid | mol % | 14 | — | 14 | — | — | 14 | — | 14 | 13.5 | — |
| Dodecane-1,12-dioic acid | mol % | 20 | — | 20 | 20 | — | — | 20 | 18 | 23 | — |
| Tridecane-1,13-dioic acid | mol % | — | 20 | — | — | — | — | — | — | — | — |
| Undecane-1,11-dioic acid | mol % | — | — | — | — | 20 | — | — | — | — | — |
| Nonane-1,9-dioic acid | mol % | — | — | — | — | — | 20 | — | — | — | — |
| Cyclohexane-1,4-dicarboxylic acid | mol % | — | — | — | — | — | — | 14 | — | — | — |
| Measured values | | | | | | | | | | | |
| Relative viscosity (RV)* | — | 1.53 | 1.50 | 1.61 | 1.53 | 1.53 | 1.53 | 1.61 | 1.53 | 1.54 | 1.54 |
| Glass transition temperature | ° C. | 212 | 206 | 206 | 198 | 201 | 207 | 195 | 195 | 204 | 76 |
| Dielectric loss factor tan δ | [10$^{-3}$] | 6.45 | 6.67 | 8.15 | 7.98 | 8.15 | 7.93 | 8.11 | 7.75 | 8.54 | 4.50 |
| Light transmittance at 2 mm | % | 92.9 | n.m. | 92.8 | n.m. | n.m. | n.m. | 93.2 | n.m. | 93.3 | 93.1 |
| Microwave oven test** | 120 s | + | + | + | + | + | + | + | + | n.p. | *** |
|  | s | n.a. | n.a. | 170 | n.a. | n.a. | n.a. | n.a. | n.a. | — | — |

*RV relative viscosity, measured on a solution of 0.5 g of polyamide in 100 ml of m-cresol at 20° C.; n.m. = not measured
**+ passed, n.p. failed, n.v. not available (≥120 s);
*** already deforms in the conditioning step (14 days at 95° C. in water).

4 Discussion of Results

For the copolyamides according to the invention from Examples 1 and 4 to 11 according to Tables 2 and 3, which have a content of dimeric fatty acid of 2% and 4% by weight respectively, it was possible to achieve distinctly higher relative viscosities across the board than for the copolyamides from Comparative Examples 2 and 3 of Table 2 with a higher content of dimeric fatty acid of 9.5% by weight.

In the preparation of the copolyamide according to Example 1, the stall torque of 120 Nm was attained and a relative viscosity of 1.62 was achieved. The copolyamides from Comparative Examples 2 and 3 likewise attained the stall torque of 120 Nm. In Comparative Example 3, however, the stall torque subsequently decreased slightly. In spite of the torque of 120 Nm, only relative viscosities of 1.38 and 1.37 respectively were obtained for the copolyamides from Comparative Examples 2 and 3. The melt viscosities of the copolyamides from Comparative Examples 2 and 3 are thus high in spite of relatively low viscosities. High melt viscosities lead to processing problems, especially in the case of large parts or thin-walled parts.

As shown by the comparison of the copolyamide from Example 1 with the copolyamides from Examples 2 and 3, the higher relative viscosity leads to an improvement in toughness of the copolyamide from Example 1, which can be seen from the improved elongation at break, impact resistance and notched impact resistance.

Table 2 additionally shows that the copolyamide from Example 3 is suitable for production of microwave-resistant mouldings.

Comparison of the copolyamides from Examples 1 and 3 to 11 with the copolyamides from Comparative Examples 12 and 13 shows that the combination of a low dielectric loss factor tan δ and a high glass transition temperature is needed to pass the microwave oven test.

The invention claimed is:

1. A moulding consisting of a moulding compound comprising an amorphous or microcrystalline copolyamide (A) containing at least the following monomers:
   (a) at least one cycloaliphatic diamine;
   (b) 1.7 to 4.0 mol % of at least one dimeric fatty acid; and
   (c) 12 to 48.3 mol % of aromatic dicarboxylic acids selected from the group consisting of isophthalic acid, terephthalic acid and naphthalenedicarboxylic acid, wherein the proportion of the isophthalic acid based on the sum total of all the monomers in the copolyamide (A) is 7 to 44 mol %, and
   (d) 5 to 25.5 mol % of at least one aliphatic dicarboxylic acid;
   where the molar proportion of isophthalic acid is at least equal to the molar proportion of terephthalic acid, and where the monomers (b), (c) and (d) add up to 50 mol % and the molar proportions of all the monomers present in the copolyamide (A) add up to 100 mol %, wherein the amorphous or microcrystalline copolyamide (A) has a relative viscosity in the range from 1.50 to 2.15, measured on a solution of 0.5 g of the copolyamide in 100 ml of m-cresol at 20° C., a glass transition temperature of at least 190° C., and a dielectric loss factor of not more than $8.3 \times 10^{-3}$;
   wherein the moulding is produced via injection moulding.

2. The moulding according to claim 1, wherein the amorphous or microcrystalline copolyamide (A) contains at least the following monomers with the following molar proportions:
   40 to 50 mol % of cycloaliphatic diamine (a);
   1.7 to 4.0 mol % of dimeric fatty acid (b);
   14 to 44 mol % of aromatic dicarboxylic acid (c); and
   5 to 25.5 mol % of aliphatic dicarboxylic acid (d);
   where the proportions of all the monomers present in the copolyamide (A) add up to 100 mol %.

3. The moulding according to claim 1, wherein
   the proportion of isophthalic acid based on the sum total of all the monomers in the copolyamide (A) is 11.5 to 27 mol %, and/or
   the proportion of terephthalic acid based on the sum total of all the monomers in the copolyamide is 0 to 22 mol %.

4. The moulding according to claim 1, wherein the amorphous or microcrystalline copolyamide (A)
   has a light transmittance measured according to ASTM D 1003-13 (2013) on a plaque of thickness 2 mm produced therefrom of at least 75%.

5. The moulding according to claim 1, wherein the amorphous or microcrystalline copolyamide (A) contains at least the following monomers:
   (a) at least one cycloaliphatic diamine component selected from the group consisting of bis(4-amino-3-methylcyclohexyl)methane, bis(4-aminocyclohexyl)methane, bis(4-amino-3-ethylcyclohexyl)methane, bis(4-amino-3,5-dimethylcyclohexyl)methane, norbornane-2,6-diamine or 2,6-bis(aminomethyl)norbornane, 1,3-diaminocyclohexane, 1,4-diaminocyclohexane, isophoronediamine, 1,3-bis(aminomethyl)cyclohexane, 1,4-bis(aminomethyl)cyclohexane, 2,2-(4,4'-diaminodicyclohexyl)propane, and mixtures thereof;
   (b) at least one dimeric fatty acid selected from the group consisting of dimeric fatty acids having 36 or 44 carbon atoms and mixtures thereof;
   (c) at least one aromatic dicarboxylic acid selected from the group consisting of isophthalic acid, terephthalic acid and mixtures thereof; and
   (d) at least one aliphatic dicarboxylic acid selected from the group consisting of hexane-1,6-dioic acid, nonane-1,9-dioic acid, decane-1,10-dioic acid, undecane-1,11-dioic acid, dodecane-1,12-dioic acid, tridecane-1,13-dioic acid, tetradecane-1,14-dioic acid, octadecane-1,18-dioic acid, cyclohexane-1,3-dicarboxylic acid, cyclohexane-1,4-dicarboxylic acid, and mixtures thereof.

6. The moulding according to claim 1, wherein the amorphous or microcrystalline copolyamide (A) contains at least the following monomers:
   (a) at least one cycloaliphatic diamine component selected from the group consisting of bis((4-amino-3-methylcyclohexyl)methane, bis((4-aminocyclohexyl)methane, bis((4-amino-3,5-dimethylcyclohexyl)methane and mixtures thereof;
   (b) at least one dimeric fatty acid having 36 carbon atoms;
   (c) isophthalic acid and terephthalic acid; and
   (d) at least one aliphatic dicarboxylic acid selected from the group consisting of dodecane-1,12-dioic acid, tetradecane-1,14-dioic acid, octadecane-1,18-dioic acid, and mixtures thereof.

7. The moulding according to claim 1, wherein the amorphous or microcrystalline copolyamide (A) contains at least one aliphatic dicarboxylic acid as further monomer (d).

8. The moulding according to claim 1, wherein the amorphous or microcrystalline copolyamide (A) is selected from the group consisting of TMDCI/TMDC12/TMDC36, TMDCI/TMDC14/TMDC36, TMDCI/TMDC9/TMDC36, TMDCI/TMDCCHD/TMDC36, TMDCI/TMDC11/

TMDC36, TMDCI/TMDC13/TMDC36, TMDCI/TMDC18/TMDC36, TMDCI/TMDCT/TMDC12/TMDC36, TMDCI/TMDCT/TMDC14/TMDC36, TMDCI/TMDCT/TMDC18/TMDC36, TMDCI/TMDCT/TMDC9/TMDC36, TMDCI/TMDCT/TMDCCHD/TMDC36, TMDCI/TMDCT/TMDC12/TMDCCHD/TMDC36 and mixtures thereof, where TMDC is optionally wholly or partly replaced by MACM, and/or where the dimeric fatty acid having 36 carbon atoms is optionally wholly or partly replaced by a dimeric fatty acid having 44 carbon atoms.

9. The moulding according to claim 1, wherein the amorphous or microcrystalline copolyamide (A) is selected from the group consisting of TMDCI/TMDC12/TMDC36, TMDCI/TMDC14/TMDC36, TMDCI/TMDC18/TMDC36, TMDCI/TMDCT/TMDC12/TMDC36, TMDCI/TMDCT/TMDC14/TMDC36, TMDCI/TMDCT/TMDC18/TMDC36 and mixtures thereof, where TMDC is optionally wholly or partly replaced by MACM, and/or where the dimeric fatty acid having 36 carbon is optionally wholly or partly replaced by a dimeric fatty acid having 44 carbon atoms.

10. The moulding according to claim 1, wherein the amorphous or microcrystalline copolyamide (A) is selected from the group consisting of TMDCI/TMDC12/TMDC36, TMDCI/TMDC14/TMDC36, TMDCI/TMDCT/TMDC12/TMDC36, TMDCI/TMDCT/TMDC14/TMDC36 MACMI/MACM12/MACM36, MACMI/MACM14/MACM36, MACMI/MACMT/MACM12/MACM36, MACMI/MACMT/MACM14/MACM36 and mixtures thereof.

11. The moulding according to claim 1, wherein the moulding compound comprises
at least one additive (B), and/or optionally
at least one further polymer (C) different from the copolyamide (A) and different from the additive (B).

12. The moulding according to claim 1, wherein the moulding compound has the following composition:
70% to 100% by weight of copolyamide (A),
0% to 10% by weight of additive (B), and
0% to 20% by weight of polymer (C),
where components (A) to (C) add up to 100% by weight.

13. A moulding consisting of a moulding compound comprising an amorphous or microcrystalline copolyamide (A) containing at least the following monomers:
(e) at least one cycloaliphatic diamine;
(f) 1.7 to 4.0 mol % of at least one dimeric fatty acid;
(g) 12 to 48.3 mol % of aromatic dicarboxylic acids selected from the group consisting of isophthalic acid, terephthalic acid, and naphthalenedicarboxylic acid, wherein the proportion of isophthalic acid based on the sum total of all the monomers in the copolyamide (A) is 7 to 44 mol %, and
(h) 5 to 25.5 mol % of at least one aliphatic dicarboxylic acid;
where the molar proportion of isophthalic acid is at least equal to the molar proportion of terephthalic acid, and
where the monomers (b), (c) and (d) add up to 50 mol % and the molar proportions of all of the monomers present in the copolyamide (A) add up to 100 mol %,
wherein the amorphous or microcrystalline copolyamide (A) has
a relative viscosity in the range from 1.50 to 2.15, measured on a solution of 0.5 g of polyamide in 100 ml of m-cresol at 20° C.,
a glass transition temperature of at least 190° C.; and
a dielectric loss factor of not more than $8.3 \times 10^{-3}$,
wherein the moulding is selected from the group consisting of dishware, dishes, pots, cups, beakers, plates, lids, sauce boats, flasks, covering trays, undertrays and serving trays.

14. A moulding consisting of a moulding compound comprising an amorphous or microcrystalline copolyamide (A) containing at least the following monomers:
(i) at least one cycloaliphatic diamine;
(j) 1.7 to 4.0 mol % of at least one dimeric fatty acid;
(k) 12 to 48.3 mol % of aromatic dicarboxylic acids selected from the group consisting of isophthalic acid, terephthalic acid and naphthalenedicarboxylic acid, wherein the proportion of isophthalic acid based on the sum total of all the monomers in the copolyamide (A) is 7 to 44 mol %, and
(l) 5 to 25.5 mol % of at least one aliphatic dicarboxylic acid;
where the molar proportion of isophthalic acid is at least equal to the molar proportion of terephthalic acid, and
where the monomers (b), (c) and (d) add up to 50 mol % and the molar proportions of all the monomers present in the copolyamide (A) add up to 100 mol %,
wherein the amorphous or microcrystalline copolyamide (A) has a relative viscosity in the range from 1.50 to 2.15, measured on a solution of 0.5 g of polyamide in 100 ml of m-cresol at 20° C.,
a glass transition temperature of at least 190° C.; and a dielectric loss factor of not more than $8.3 \times 10^{-3}$, wherein the moulding is produced via injection moulding and is selected from the group consisting of dishware, dishes, pots, cups, beakers, plates, lids, sauce boats, flasks, covering trays, undertrays and serving trays.

* * * * *